United States Patent
Han et al.

(10) Patent No.: US 8,233,704 B2
(45) Date of Patent: Jul. 31, 2012

(54) EXEMPLAR-BASED HETEROGENEOUS COMPOSITIONAL METHOD FOR OBJECT CLASSIFICATION

(75) Inventors: Feng Han, Lawrenceville, NJ (US); Hui Cheng, Bridgewater, NJ (US); Jiangjian Xiao, Plainsboro, NJ (US); Harpreet Singh Sawhney, West Windsor, NJ (US)

(73) Assignee: SRI International, Menlo Park, CA (US)

( * ) Notice: Subject to any disclaimer, the term of this patent is extended or adjusted under 35 U.S.C. 154(b) by 1086 days.

(21) Appl. No.: 12/136,138

(22) Filed: Jun. 10, 2008

(65) Prior Publication Data

US 2008/0310737 A1 Dec. 18, 2008

Related U.S. Application Data

(60) Provisional application No. 60/943,631, filed on Jun. 13, 2007.

(51) Int. Cl.
*G06K 9/62* (2006.01)
*G06E 1/00* (2006.01)
*G06E 3/00* (2006.01)
*G06F 15/18* (2006.01)
*G06G 7/00* (2006.01)

(52) U.S. Cl. .......................................... 382/159; 706/20
(58) Field of Classification Search .......... 382/155–161; 706/12, 20
See application file for complete search history.

(56) References Cited

U.S. PATENT DOCUMENTS

| 7,421,415 | B2* | 9/2008 | Dong et al. | 706/12 |
| 7,536,044 | B2* | 5/2009 | Zhou et al. | 382/128 |
| 7,965,886 | B2* | 6/2011 | Han et al. | 382/159 |
| 2006/0062451 | A1* | 3/2006 | Li et al. | 382/159 |
| 2008/0063263 | A1* | 3/2008 | Zhang et al. | 382/159 |
| 2008/0089579 | A1* | 4/2008 | Han et al. | 382/159 |
| 2008/0310737 | A1* | 12/2008 | Han et al. | 382/224 |
| 2011/0176725 | A1* | 7/2011 | Homma et al. | 382/159 |
| 2012/0002869 | A1* | 1/2012 | Han et al. | 382/159 |

OTHER PUBLICATIONS

Nowak, Eric et al, "Sampling Strategies for Bag-of-Features Image Classification," ECCV, 2006, pp. 490-503.*
Ommer et al., "Learning Compositional Categorization Models," Proceedings European Conference on Computer Vision (ECCV06), 2006.
Agarwal et al., "Learning a Sparse Representation for Object Detection," ECCV02, 2002.

(Continued)

*Primary Examiner* — Aaron W Carter
(74) *Attorney, Agent, or Firm* — Moser Taboada

(57) ABSTRACT

A method for automatically generating a strong classifier for determining whether at least one object is detected in at least one image is disclosed, comprising the steps of: (a) receiving a data set of training images having positive images; (b) randomly selecting a subset of positive images from the training images to create a set of candidate exemplars, wherein said positive images include at least one object of the same type as the object to be detected; (c) training a weak classifier based on at least one of the candidate exemplars, said training being based on at least one comparison of a plurality of heterogeneous compositional features located in the at least one image and corresponding heterogeneous compositional features in the one of set of candidate exemplars; (d) repeating steps (c) for each of the remaining candidate exemplars; and (e) combining the individual classifiers into a strong classifier, wherein the strong classifier is configured to determine the presence or absence in an image of the object to be detected.

19 Claims, 5 Drawing Sheets

OTHER PUBLICATIONS

Zhang et al., "Object Class Recognition Using Multiple Layer Boosting with Heterogeneous Features," Proceedings of the Conference on Computer Vision and Pattern Recognition, 2005.

Marszalek et al., "Spatial Weighting for Bag-of Features", Proceedings Conference on Computer Vision and Pattern Recognition (CVPR06), 2006.

Weber et al., "Unsupervised Learning of Models for Recognition", Proceedings of the 6th European Conference of Computer Vision, Dublin, Ireland, pp. 18-32, 2000.

Fergus et al., "Object Class Recognition by Unsupervised Scale-Invariant Learning", Proceedings of the Conference on Computer Vision and Pattern Recognition, Madison, Wisconsin, USA, 2003.

Leibe et al., "Combined Object Categorization and Segmentation with and Implicit Shape Model", ECCV04 Workshop of Statistical Learning in Computer Vision, pp. 1732, Prague, 2004.

Lowe et al., "Local Feature View of Clustering for 3D Object Recognition", Proceedings of the Conference on Computer Vision and Pattern Recognition, Kauai, Hawaii, USA, pp. 682-688, Dec. 2001.

Ullman et al., "A Fragment-based Approach to Object Representation and Classification", 4th International Workshop on Visual Form, Capri, Italy, May 2001.

Joachims., "Text Categorization with Support Vector Machines: Learning with Many Relevant Features", ECML-98, 10th European Conference on Machine Learning, Springer Verlag 1998.

Dance et al., "Visual Categorization with Bags of Keypoints", ECCV Workshop on Stat. Learn. in Comp. Vis., 2004.

Berg et al., "Shape Matching and Object Recognition Using Low Distortion Correspondence", Proceedings of the Conference on Computer Vision and Pattern Recognition, 2005.

Holub et al, Combining Generative Models and Fisher Kernels for Object Class Recognition, ICCV, 2005.

\* cited by examiner

EXEMPLAR-BASED HETEROGENEOUS COMPOSITIONAL METHOD FOR OBJECT CLASSIFICATION

CROSS-REFERENCE TO RELATED APPLICATIONS

This application claims the benefit of U.S. provisional patent application No. 60/943,631 filed Jun. 13, 2007, the disclosure of which is incorporated herein by reference in its entirety.

FIELD OF THE INVENTION

The present invention relates generally to vision systems, and more particularly to a method for creating a strong classifier for automatically determining whether at least one object is present in at least one image.

BACKGROUND OF THE INVENTION

The accurate classification of objects in an image or series of images is highly desirable in applications such as video surveillance or moving target detection in ground or low altitude air vehicles (manned or unmanned). Such applications need to detect moving objects in an operating environment; to automatically detect potential targets/threats that pop-up or move into view for military vehicles and alert an operator of a vehicle to these potential threats; and for the safe operation of (unmanned) ground vehicles, where there is a need to detect moving and stationary pedestrians/dismounted personnel in order to prevent accidents. In such applications it is desirable to verify in an entire image or image patch (region) the presence or absence of instances of particular object classes such as cars, people, bicycles, etc. The problem is very challenging because the appearance of object instances in the same category varies substantially due to changes in pose, aspect and shape. Ideally, a representation should be flexible enough to cover a wide range of visually different object classes, each with large within-category variations, while still retaining good discriminative power between the object classes.

"Part" or "fragment" based models, which combine local image features or regions into loose geometric assemblies, offer one possible solution to this problem. Constellation models provide a probabilistic way to mix the appearance and location of local descriptors. However, one of the major limitations of constellation models is that they require an explicit enumeration over possible matching of model features to image features. This optimal, but expensive step limits the model to a relatively few detected features. Thus, to keep computational requirements low, a large amount of available image information must be ignored, especially in cases where objects in an image or video stream have many parts.

A "bag-of-features" representation, which models an image as an orderless collection of local features, has become increasingly popular for object categorization due to its simplicity and good performance. Bag-of-features representations evolved when texton based texture analysis models began to be applied to object recognition. "Bag-of-features" representations are analogous to "bag-of-words" representations used in document analysis, in which image patches are the visual equivalents of individual "words" and the image is treated as an unstructured set ('bag') of patches. One bag-of-features representation known in the art is described in "Learning Compositional Categorization Models", Proceedings European Conference on Computer Vision (ECCV06), 2006 (hereinafter "Ommer and Buhmann"). Ommer and Buhmann describes a composition of individual features as the basic unit in bag-of-features representation. However, using individual features in a bag-of-features representation has been shown to be not very discriminative, which makes the model susceptible to classifying background features as part of a desired feature of interest. In addition, the ignorance of the spatial relations among local features also severely limits the descriptive ability of the representation. Moreover, such models cannot deal with large within-category variations of the same object caused by aspect, pose and shape variations.

Accordingly, what would be desirable, but has not yet been provided, is a more discriminative method for creating a strong (i.e., highly discriminative) classifier that effectively and automatically classifies objects in one or more images of a video sequence or datastream.

SUMMARY OF THE INVENTION

The above-described problems are addressed and a technical solution is achieved in the art by providing a method for automatically generating a strong classifier for determining whether at least one object is detected in at least one image, comprising the steps of: (a) receiving a data set of training images having positive images; (b) randomly selecting a subset of positive images from the training images to create a set of candidate exemplars, wherein said positive images include at least one object of the same type as the object to be detected; (c) training a weak classifier based on at least one of the candidate exemplars, said training being based on at least one comparison of a plurality of heterogeneous compositional features located in the at least one image and corresponding heterogeneous compositional features in the one of set of candidate exemplars; (d) repeating steps (c) for each of the remaining candidate exemplars; and (e) combining the individual classifiers into a strong classifier, wherein the strong classifier is configured to determine the presence or absence in an image of the object to be detected. An AdaBoost method is employed to combine the individual classifiers into a strong classifier.

Training a weak classifier based on at least one of the candidate exemplars further comprises the steps of: generating a plurality of single heterogeneous features from the at least one image; clustering single heterogeneous features about a set of centers to obtain a set of composite heterogeneous feature clusters, each of the feature clusters becoming a composition candidate entry in a candidate compositional codebook; selecting at least one of the candidate compositions based on a best match to the one of the candidate exemplars to obtain an exemplar-based composition codebook; encoding spatial relationships between each of the entries in an exemplar based compositional codebook to produce an exemplar based geometric template; comparing the entries in exemplar based composition codebook to the entries in candidate compositional codebook using histogram quantization to obtain a bag of compositional features representation; computing differences between distances and orientations of the spatial relationships of the exemplar based geometric template and distances and orientations in the candidate compositions codebook to form a global shape deformation; and feeding the bag of compositional features representation and the global shape deformation to a supporter vector machine (SVM), the SVM outputting the weak classifier.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

The present invention is an exemplar-based heterogeneous compositional method that utilizes heterogeneous features to capture local object structures in an image. An image is input to the method. In the common portions of the method embodiments, a video vocabulary of single heterogeneous features is created from one or more images. A perceptual grouping or clustering of local sub-part features from the one or more images is conducted to obtain a set of possible candidate compositions. The candidate compositions are treated as one word in the video vocabulary. Each of the composition candidates, which comprise different numbers of heterogeneous features, is filtered by an exemplar-based classifier to produced a reduced-size exemplar-based compositional codebook. An exemplar is an image containing clusters of shapes corresponding to real aspects of shape change. Within the exemplar-based classifier blocks, each composition candidate is encoded in a consistent representation by representing each composition as a distribution over an exemplar based compositional codebook, i.e. a bag of sub-parts, or feature vector. This codebook is obtained using histogram quantization in a learning stage, which model typical configurations of the sub-parts of the categories under consideration. After converting all regions to feature vectors by histogram quantization, the feature vectors and geometric deformations are input to a supporter vector machine (SVM). The output of the SVM is fed to an AdaBoost algorithm, which in turn outputs a final categorization label or "strong" classifier.

Figure 1:
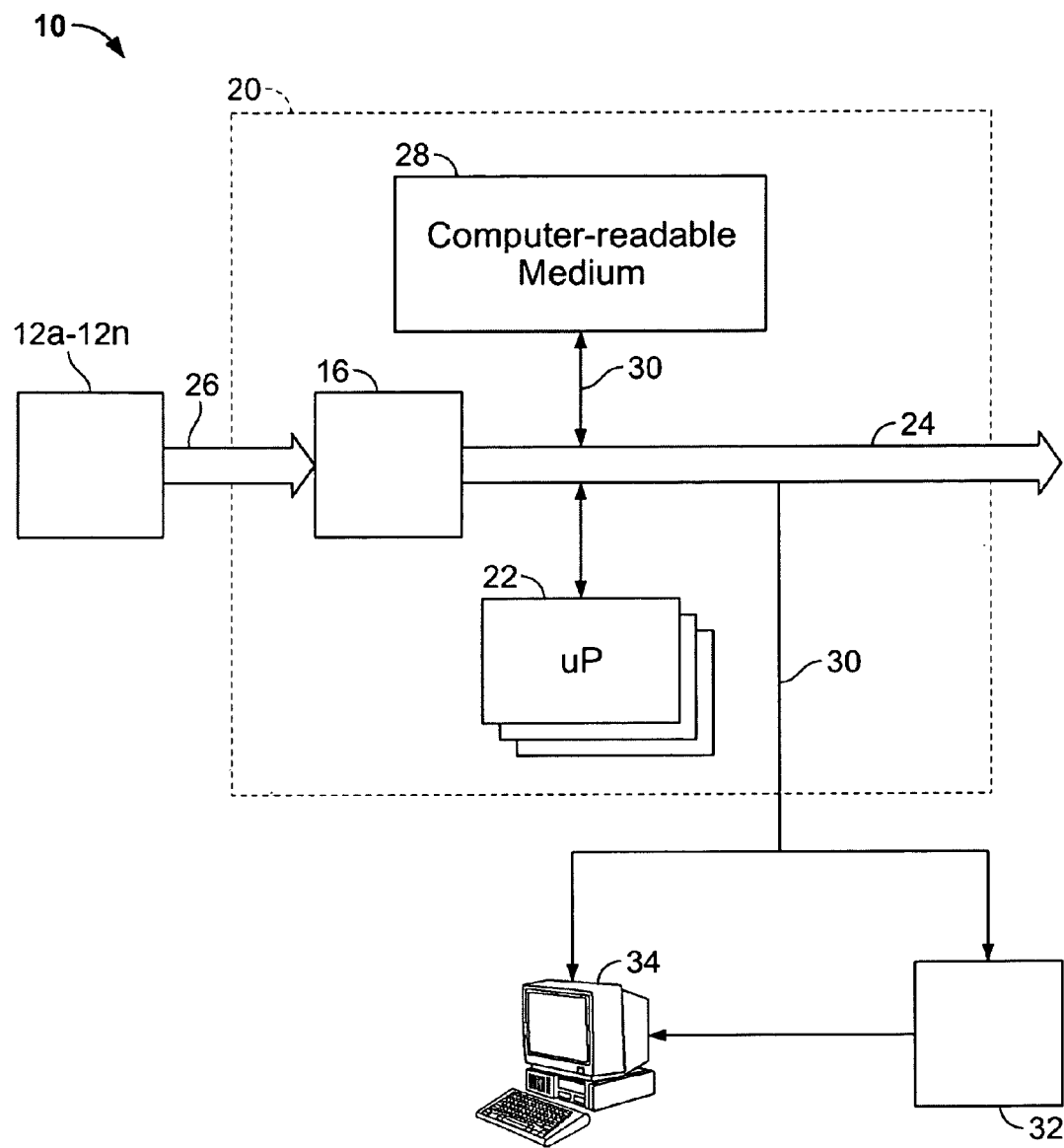
FIG. 1 is a block diagram of a hardware architecture of an object categorization system, constructed in accordance with an embodiment of the present invention.

Referring now to FIG. 1, an object categorization system (or appearance classifier) is depicted, generally indicated at 10. By way of a non-limiting example, the system 10 receives one or more digitized video images from one or more cameras 12a-12n, which may be still cameras or video cameras. Alternatively, the still or moving digital images can be a preprocessed digital data stream coming from a digital video capturing system composed of standalone hardware, or cards 16 such as Firewire cards which can plug-in directly to a computing platform 20. The computing platform 20 may include a personal computer or work-station (e.g., a Pentium-M 1.8 GHz PC-I 04 or higher) comprising one or more processors 22 which includes a bus system 24 which is fed by video data streams 26 via the processor or directly to a computer readable medium 28. The computer readable medium 28 can also be used for storing the instructions of the system 10 to be executed by the one or more processors 22, including an operating system, such as the Windows or the Linux operating system. The computer readable medium 28 can include a combination of volatile memory, such as RAM memory, and nonvolatile memory, such as flash memory, optical disk(s), and/or hard disk(s). A processed video data stream 30 can be stored temporarily in the computer readable medium 28 for later output or fed in real time locally or remotely via an optional transmitter 32 to a monitor 34. The monitor 34 can display processed video data stream 30 showing a scene (not shown) overlaid with bounding boxes enclosing objects if classified as found in the scene, or no bounding boxes if at least one object is not found in the scene. If the objects are found in the scene, the bounding boxes are accompanied by text and/or numerical coordinates, such as GPS coordinates.

Figure 2:
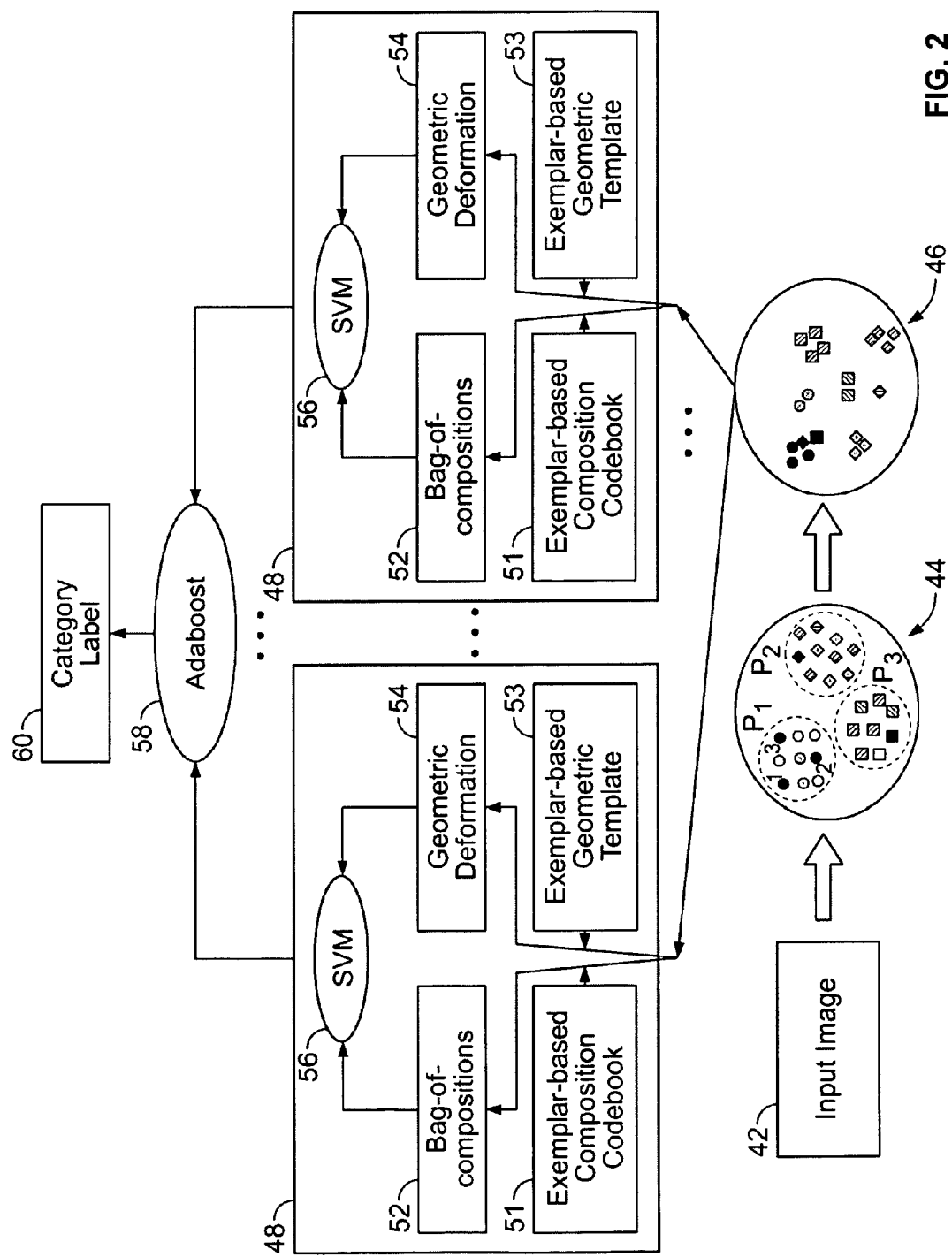
FIG. 2 is block diagram of the software architecture associated with the system of FIG. 1.

Referring now to FIG. 2, a software architecture of the method of the present invention is depicted. An input image 42 is received. At block 44, a number of single heterogeneous features is generated from the input image 42. Given the input image 42, a number of SIFT features (Scale Invariant Feature Transformation, i.e., a technique for automatically detecting interesting features in image)—region features and curve features—are first detected and these feature vectors act as the descriptors of the sub-parts of objects (e.g., the arms, feet, head, etc., of people, wherein a person is the object to be detected). Block 44 may produce a set of say, 10000 single heterogeneous features. A perceptual grouping or clustering of these local sub-part descriptors about a set of centers (of the local sub-part features) is conducted to obtain a reduced set of composite heterogeneous feature clusters. A composite heterogeneous feature cluster is treated as one word in the video vocabulary. In this way, a video vocabulary of candidate feature compositions is obtained. This grouping leads to a sparse image representation based on (probably overlapping) individual features, where each candidate feature composition represents an agglomeration of local sub-parts and thus encodes the parts of objects in a robust way (e.g., feet and legs of a person are clustered together, so as to reduce the 10000 heterogeneous features to a set of about 1000 cluster centers). Each of the cluster centers becomes one entry in a candidate compositional codebook 46.

Each of the composition candidates of the candidate compositional codebook is "filtered" by a set of exemplar-based classifiers in a plurality of exemplar based classifier blocks 48. For the training stage, a number of exemplars are obtained from a random selection of a subset of a plurality of training images. For the testing stage, a set of discriminative exemplars are provided, the discriminative exemplars being derived in the learning stage. Each of these exemplars selects a subset of general codebook entries to get an exemplar-based composition codebook, one for each exemplar. For each exemplar, a set of "best matches" of the candidate composition in the candidate compositional codebook to the exemplar under test is obtained to produce the exemplar-based compositional codebook 51. For example, the set of 1000 candidate compositions may contain arms and legs from a front view, side view, and back view. One exemplar may filter the 1000 compositional candidates to a reduced set of say 200 "best matching" codebook entries of, e.g., feet and legs from the front view, while another exemplar obtains another set of 200 codebook entries of, e.g., feet and legs from the side view, etc. This process is repeated for each of the other exemplars on the same set of compositional candidates from other poses (say, the back view and side view) to obtain a set of exemplar based compositional codebooks 51.

Once the exemplar based compositional codebooks are formed, then the locations in the image of each of the entries in an exemplar based compositional codebook 51 are determined. The spatial relationships between each of the entries in an exemplar based compositional codebook are encoded to produce an exemplar based geometric template 53 for each of the blocks 48. These spatial relationships may be encoded, for example, a histogram in the preferred embodiment.

Within each of the exemplar-based block 48, each composition candidate is encoded in a consistent representation by representing each composition as a distribution over the exemplar based composition codebook 51, i.e., a bag of subparts, or feature vector. The entries in exemplar based composition codebook 51 are now compared to the entries in original candidate compositional codebook 46 obtained using histogram quantization to obtain a bag-of-compositions 52. For each candidate codebook entry that is considered a "match" to a corresponding codebook entry in the exemplar based compositional codebook 51, a "vote" is given to the matching entry. The collection of votes for each codebook entry forms a histogram of a bag of compositional features representation 52.

The exemplar based geometric template 53 encoding spatial relationships in the exemplar based compositional codebook 51 can now be compared to the same spatial relationships in the candidate compositional codebook of the input image 42 to obtain a global shape deformation 54. The difference in the distances and orientations of the spatial relationships of the exemplar based geometric template 53 compared to the original set of candidate compositions codebook 46 form the global shape deformation 54. For example, for an entry in the exemplar based geometric template 53, the distance between a hand and head is 3 at 45 degree angle, but for a "best match" entry in the candidate compositions codebook 46, the distance of the "best match" is 7 at 50 degree angle. The difference is encoded as an entry in the global shape deformation 54. The process is repeated for all exemplar based compositional codebook entries. These differences can also be encoded by histogram quantization to represent the global shape deformation 54.

After converting all regions of the image 42 to feature vectors by histogram quantization, the bag of compositional features representation 52 and the global shape deformation 54 for each of the exemplar based classifier blocks 48 are input to a supporter vector machine (SVM—standard Landing algorithm known in the art) 56 which outputs a "weak" classifier, each weak classifier being associated with a particular position of training samples. These weak classifiers are selected based on the view/pose of an object, such as front view, rear view, side view, etc., of the object such as a person or a vehicle. Thus, each weak classifier can recognize the object from one specific pose or aspect. Each of the weak classifiers is generated or selected using one exemplar. The output of the SVM 56 is fed to an Adaboost algorithm 58 to be described hereinbelow. For the testing stage, the Adaboost algorithm 58 outputs a final categorization label 60, i.e., the object is present or not present in the image 42. For the training stage, the Adaboost algorithm 58 outputs a "strong" classifier, which is a weighted linear combination of the simple "weak" classifiers, i.e., the combination of poses for a candidate composition type (e.g., all poses of a person) and a set of discriminative exemplars to be used in the testing stage. A strong classifier is capable of classifying an object, e.g., a car or person, from any pose or aspect.

The Training Method Embodiment

Let $\beta = \{(I_1, y_1), \ldots, (I_l, y_l)\}$ be a set of training sample images, where $I_i$ is the ith sample image, $y_i = \{-1, 1\}$ is the category label of the image, and $l=m+n$ is the number of training samples including m positives and n negatives. The training sample images can be "positive," i.e., contain typical parts of the objects of interest such as a heads, feet, arms, legs for people, and for vehicles the wheels, trunk, etc. "Negative" sample images would be images that do not contain these aforementioned features. The model underlying these training samples for categorization is learned by minimizing an exponential loss function L over the training set B, $$\min_{\{\alpha_t, \theta_t\}_1^T} \sum_{i=1}^{l} L(y_i, F(I_i; \{\alpha_t, \theta_t\}_1^T)), \qquad (1)$$

where the additive model $$F(I; \{\alpha_t, \theta_t\}_1^T) \equiv \sum_{t=1}^{T} \alpha_t f(I; \theta_t), \qquad (2)$$

is used to map an image I to its corresponding category label, $\alpha_t$ and $\Theta_t$ are the parameters for F, T is the number of basis function $f$ in F, and L is defined as $$L(y, F(I)) = \exp(-y F(I)). \qquad (3)$$

The rational for using an exponential loss function and an additive model for classification is well established in the AdaBoost literature. The basis function, $f$, defined later, is called a "weak classifier" in this context. Note that each function $f$ is a classifier defined with respect to the $t^{th}$ exemplar as defined below.

In (1), the parameter set $\Theta_t$ for each weak classifier $f(I;\Theta_t)$ is defined as $$\Theta_t = \{E_t, C_t, S_t, \Lambda_t\} \qquad (4)$$

where $E_t$ is the tth exemplar, $C_t$ is the exemplar-oriented codebook selected by $E_t$, $S_t$ is the global shape template computed from $E_t$, and $\Lambda_t$ is the set of the parameters for each classifier. SVM is used to build a weak classifier with the exemplar-oriented codebook and global shape of the exemplar. So it is clear that the weak classifier $f(I;\Theta_t)$ is indeed an exemplar-based one to concentrate on one cluster of object instances.

The above formulation highlights the two important aspects of the present invention. Weak classifiers, which are built under the guidance of exemplars in an inner loop, are combined in an objective function expressed in terms of exemplars (1). This process is conceptually equivalent to clustering the training samples based on aspect, pose and shape, and has been seamlessly integrated into a unified and automated framework.

Following the problem formulation above, the goal of the training process is to determine the optimal parameter set $\{\alpha_t, \Theta_t\}_1^T$. Since the objective function in (1) contains two nested additive models, the problem can be naturally solved with a nested procedure. More specifically, an outer AdaBoost is used to select discriminative exemplars and combine them into the final strong classifier F as in (1), and an inner SVM is used to build an exemplar-based classifier.

In the following discussion, the outer AdaBoost (detailed in Algorithm 1) produces a "strong classifier", and the inner SVM is called an "exemplar-based weak classifier" or simply the "weak classifier".

Algorithm 1 Learning Discriminative Exemplars

Require: Candidate exemplar set $B_c = \{(I_j^c, y_j^c)\}$, and sample set $B_s = \{(I_i^s, y_i^s)\}$, where $B_c \cap B_s = B$.

1:     Initialize sample weights $w_{1,i} = \frac{1}{2m_s}, \frac{1}{2n_s}$, for $y_j^s = 0, 1$ respectively, where $m_s$ and $n_s$ are the number of positives and negatives respectively.

2:     for t = 1, ..., T do

3:        Normalize the weights: $w_{t,i} \leftarrow w_{t,i} / \sum_{j=1}^{1} w_{t,j}$ 4:        for each candidate exemplar c = 1, ..., $l_c$ do
5:           Train an exemplar-based classifier $f(I; \Theta_c)$ as in Sec. 5.2.

6:           Compute error rare $\epsilon_c = \sum_i w_{t,i} |f(I; \Theta_c) - y_i^s|$.

7:     end for
8:     Choose $f(I; \Theta_t)$ to be the classifier with the lowest error $\epsilon_t$ 9:     Update the weights: $w_{t+1,i} \leftarrow w_{t,i} \beta_t^{1-e_i}$, where $\beta_t = \frac{\epsilon_t}{1-\epsilon_t}$, and $e_i = 0, 1$ for incorrect classification and correct classification respectively.

10: end for

Ensure: The set of discriminative exemplars $\varepsilon = \{E_t\}_1^T$, and the strong classifier $\sum_{t=1}^{T} \alpha_t f(I; \Theta_t)$, where $\alpha_t = \log \frac{1}{\beta_t}$.

As shown in Algorithm 1, the input of the outer AdaBoost is a candidate exemplar set $\beta_c$ and a sample set $\beta_s$. The samples in $\beta_c$ are randomly selected and removed from the original sample set $\beta$, and $\beta_s$ contains the remaining samples. The output of this algorithm is the strong classifier as in (1) and the discriminative exemplar set $\epsilon$, which is a subset of $\beta_c$.

Steps from 1 to 3 and 8 to 10 are the standard AdaBoost steps initializing and updating sample weights, and combining the weak classifiers into a strong classifier according to the training error of the best weak classifier f at each iteration t. Steps from 4 to 7 iterate through all the candidate exemplars, compute a weak classifier based on each exemplar, and compute the training error rate for each weak classifier.

It is clear from Algorithm 1 how the parameters at in (1) are computed, and hypothetical exemplars in (4) are generated and selected. The remaining parameters in $\alpha_t$ are related to each exemplar, and are computed with the inner SVM detailed hereinafter.

The rationale for using an exponential loss function and an additive model for classification is well-established in the AdaBoost literature. The basis function $f$, defined later, is called a "weak classifier" in this context. Note that each function $f$ is a classifier defined with respect to the tth exemplar as defined below. Algorithm 1 is a standard Landing formulation which minimizes an error. In the inner loop of the Landing formulation, a number of exemplars are examined.

Each exemplar can, for example, represent all regions with people seen from a side view. Different views, i.e., exemplars, are combined together into a strong classifier. Given one exemplar of people from a side view, a week classifier can be built to recognize all people from one view. The outer loop combines all poses to give one strong classifier.
Implementation Details (Section 5.2)

Referring again to FIG. 2, two feature vectors are computed from the object and used in an SVM for classification. The first feature vector is a collection of bag-of-compositional-features 52, which is computed based on a specific codebook of compositional features generated with the guidance of the selected exemplar. The second feature vector encodes the global shape deformation 54 of the object compared with the exemplar.

Figure 3A:
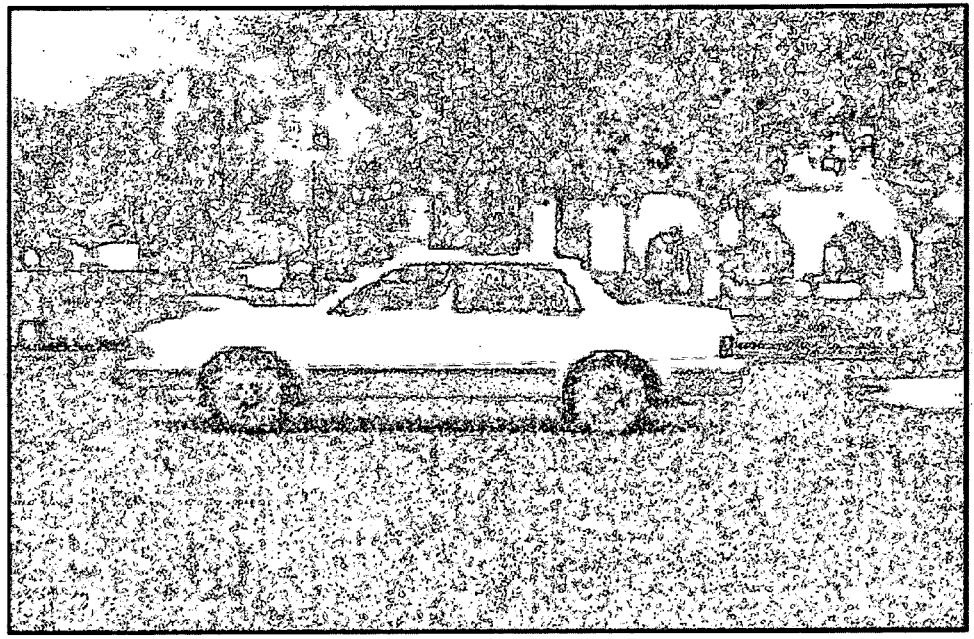
FIG. 3A is an image of a car to be input to a feature detection algorithm.
Figure 3B:
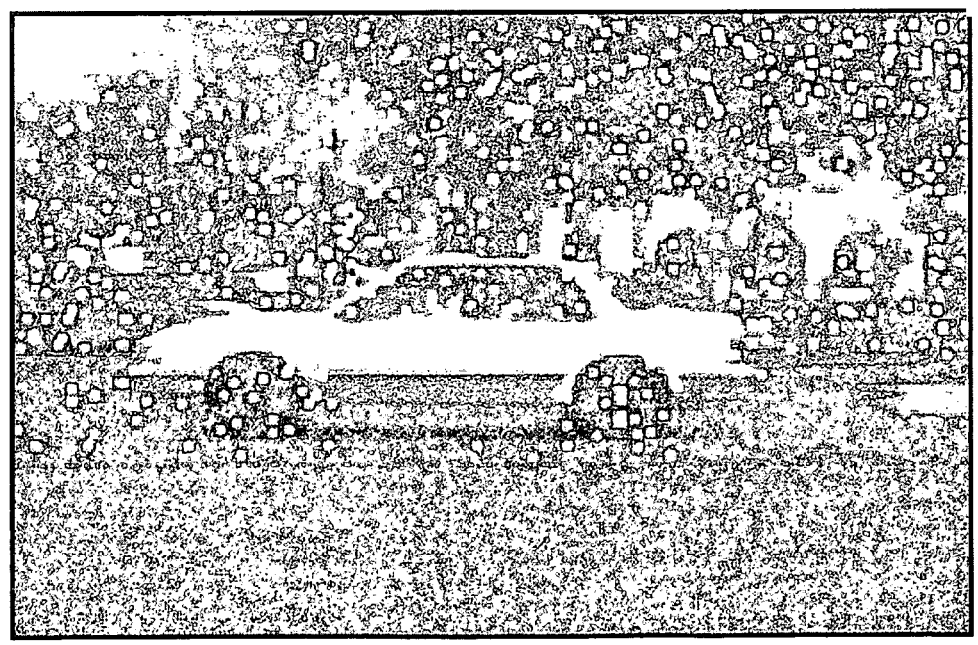
FIGS. 3B-3D are a set of video images resulting from the application of different types of feature detector algorithms.
Figure 3C:
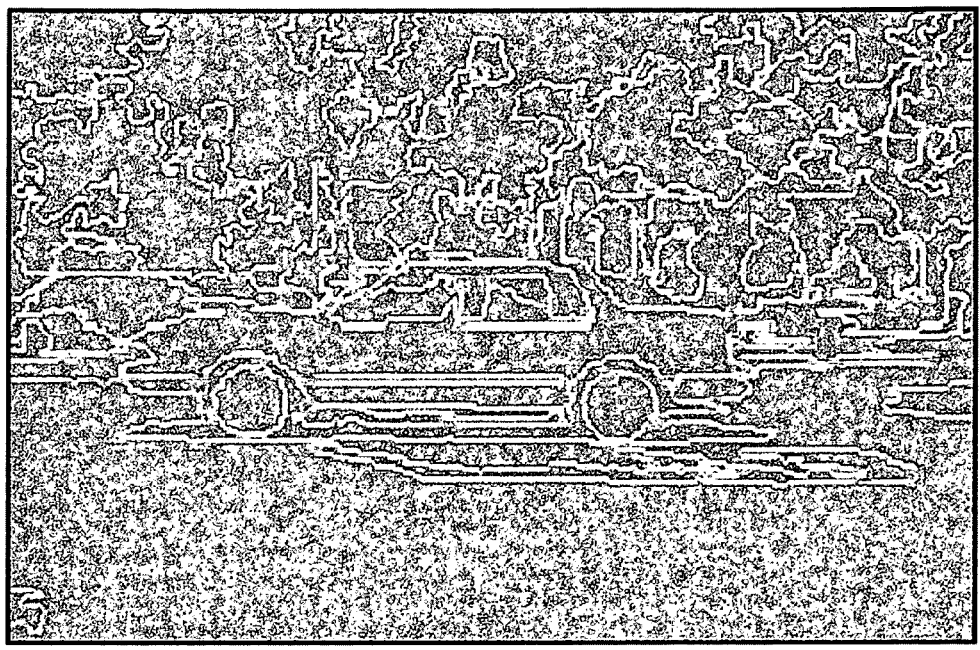
Figure 3D:
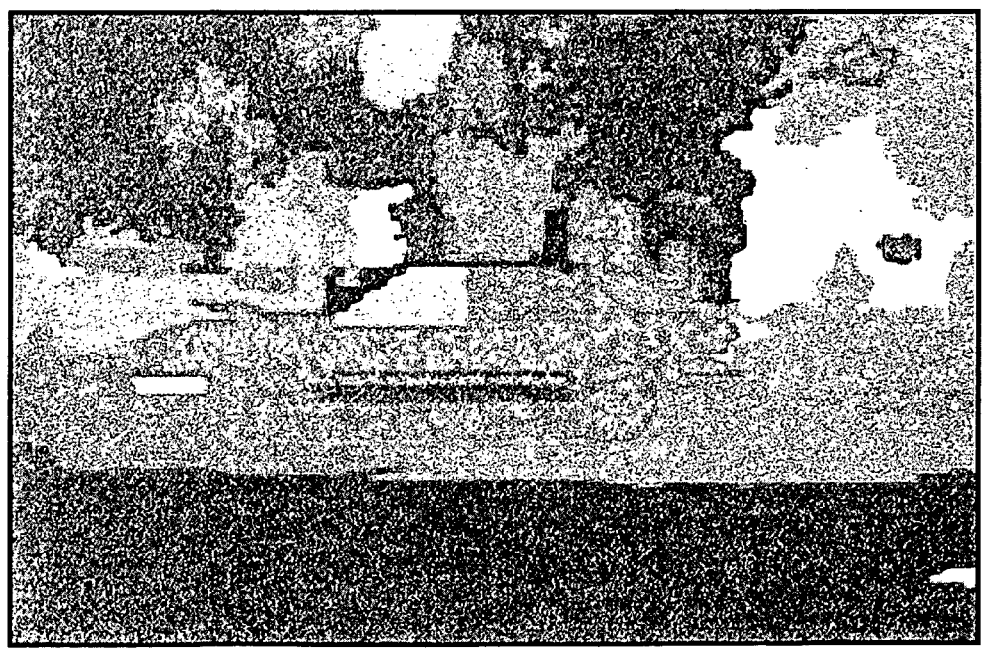

The present invention can utilize a combination of different features detectors, the optimal selection being made automatically. This makes the method of the present invention robust to the type of category to be learned. Referring to FIGS. 3A-3D, examples of three types of features on one car image (FIG. 3A) are depicted. In the present invention, these three feature types include: SIFT (FIG. 3B); Edges (FIG. 3C) and Regions (FIG. 3D). These three features were chosen since they are somewhat complementary in their properties and thus can model almost all local object structures.

Figure 4:
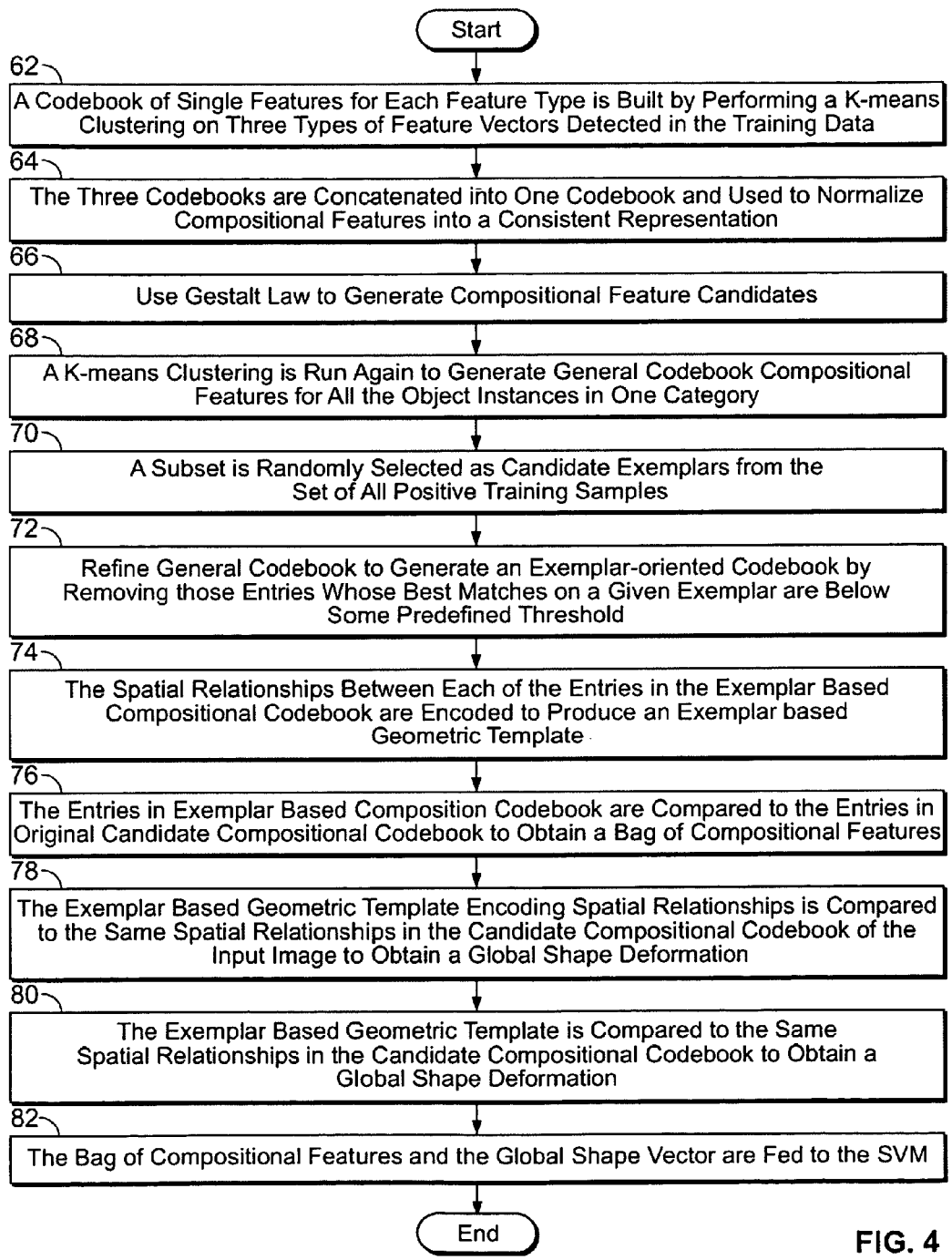
FIG. 4 is a flow chart illustrating the steps taken to obtain a "weak classifier."

Referring now to FIG. 4, the detailed steps for training a weak classifier are depicted. At step 62, before building an exemplar-oriented codebook of compositional features, a codebook of single features for each feature type is built (e.g., with k=100 entries) by performing a k-means clustering on all the three types of feature vectors detected in the training data as depicted in FIGS. 3A-3D. At step 64, the three codebooks are concatenated into one codebook and used to normalize compositional features into a consistent representation. Given all detected local single features in an image, at step 66, the algorithm outlined in "Ommer and Buhmann" to use the principles of perceptual organization, i.e., Gestalt laws, is followed to generate compositional feature candidates. In the "Ommer and Buhmann" algorithm, each of the detected local single features is then grouped with neighboring features that are not farther away than 60-100 pixel (depending on the scale of the local feature). Given all compositional feature candidates, at step 68, a k-means clustering is run again to generate a general codebook (now with a larger sample set, e.g., with k=6000 entries) of compositional features for all the object instances in one category. In step 70, a subset (300 in this example implementation) is randomly selected as candidate exemplars from the set of all positive training samples. At step 72, the above obtained general codebook is refined to generate an exemplar-oriented compositional codebook by removing those entries whose best matches on a given exemplar are below some predefined threshold. In this way, not only are entries corresponding to the background removed, but the refined codebook is specifically representative of object instances that are similar to the exemplar. At step 74, the spatial relationships between each of the entries in the exemplar based compositional codebook are encoded to produce an exemplar based geometric template. The spatial relationships are encoded in a pair-wise spatial relationship representation (PSR), wherein the distance of one objects in the exemplar-based compositional codebook from the PSR of the exemplar used to obtain the codebook is encoded. At step 76, the entries in exemplar based composition codebook are compared to the entries in original candidate compositional codebook to obtain a bag of compositional features as previously described. At step 78, the exemplar based geometric template encoding spatial relationships is compared to the same spatial relationships in the candidate compositional codebook of the input image to obtain a global shape deformation as previously described. Sample pair-wise spatial relationship representation can be found in S. Agarwal and D. Roth, "Learning a sparse representation for object detection," ECCV02, 2002, and W. Zhang, B. Yu, G. Zelinsky and D. Samaras, "Object Class Recognition Using Multiple Layer Boosting with Heterogeneous Features," Proceedings of the Conference on Computer Vision and Pattern Recognition, 2005, the disclosures of which are incorporated herein by reference in their entirety. At step 80, the exemplar based geometric template is compared to the same spatial relationships in the candidate compositional codebook to obtain a global shape deformation as previously described. At step 82, the bag of compositional features and the global shape vector are fed to the SVM.

The present invention has several advantages over prior art object categorization methods. Instead of using only one type of feature in a representation, a set of heterogeneous features are used to capture local object structures. This scheme is more robust to correctly for the type of category to be learnt. Instead of using a single feature as the basic unit in a representation, a composite model is used to combine neighboring single features and thus pool the spatial co-occurrence statistics among them. The resulted new basic unit—"compositional feature"—is more discriminative. A novel learning algorithm is used to automatically select a number of discriminative exemplars and incorporate them into the final representation to explicitly model the variations caused by aspect, pose, and shape changing. These exemplars conceptually divide one object category into a number of clusters, and the object instances within each cluster share the same pose, aspect and shape. This, in turn, makes the modeling of both appearance and spatial relation among constituent features for an object category a much easier problem and thus provides performance improvement.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for automatically generating a strong classifier for determining whether at least one object is detected in at least one image, comprising the steps of:
   (a) receiving a data set of training images having positive images;
   (b) randomly selecting a subset of positive images from the training images to create a set of candidate exemplars, wherein the subset comprises at least one image and the positive images include at least one object of the same type as the object to be detected;
   (c) training one or more weak classifiers based on at least one candidate exemplar from the set of candidate exemplars, the training being based on at least one comparison of a plurality of heterogeneous compositional features located in the at least one image and corresponding heterogeneous compositional features in the at least one candidate exemplar, wherein the training comprises clustering the plurality of heterogeneous compositional features and the corresponding heterogeneous compositional features about a set of centers to obtain a set of composite heterogeneous feature clusters and encoding spatial relationships between each of the composite heterogeneous feature clusters in the set of composite heterogeneous feature clusters to produce an exemplar based geometric template; and
   (d) combining the one or more weak classifiers into a strong classifier, wherein the strong classifier is configured to determine the presence or absence in an image of the object to be detected.

2. The method of claim 1, further comprising the steps of:
   before step (c), selecting a set of weights based on at least the positive images and before step (d):
   (e) computing error rate of the trained weak classifier;
   (f) repeating steps (c) and (e) for each of the remaining candidate exemplars;
   (g) selecting the trained weak classifier with a lowest error rate; and
   (h) repeating steps (c), (d), and (e) through (g) using another set of weights until all the trained weak classifiers have been selected.

3. The method of claim 1, wherein step (c) further comprises the steps of:
   (i) generating a plurality of single heterogeneous features from the at least one image;
   (j) forming each of the feature clusters into a composition candidate entry in a candidate compositional codebook
   (k) selecting at least one of the candidate compositions based on a best match to the one of the candidate exemplars to obtain an exemplar-based composition codebook;
   (l) storing the encoded spatial relationships between each of the entries in an exemplar based compositional codebook to produce the exemplar based geometric template;
   (m) comparing the entries in exemplar based composition codebook to the entries in candidate compositional codebook using histogram quantization to obtain a bag of compositional features representation;
   (n) computing differences between distances and orientations of the spatial relationships of the exemplar based geometric template and distances and orientations in the candidate compositions codebook to form a global shape deformation; and
   (o) feeding the bag of compositional features representation and the global shape deformation to a supporter vector machine (SYM), the SVM outputting the weak classifier.

4. The method of claim 3, wherein step (j) further comprises the step of performing a k-means clustering on Scale Invariant Feature Transformation (SIFT) features, region features, and curve features detected in the plurality of single heterogeneous features to obtain SIFT, region, and curve codebooks.

5. The method of claim 4, further comprising the step combining the SIFT, region, and curve codebooks into the candidate compositional codebook.

6. The method of claim 5, further comprising the step of using Gestalt laws to generate compositional feature candidates.

7. The method of claim 6, wherein using Gestalt laws to generate compositional feature candidates further comprises the steps of grouping local single features with neighboring features that are not farther away than 60-100 pixel and performing a k-means clustering to generate a general codebook of compositional features for all the object instances in one category.

8. The method of claim 7, further comprising the step of refining the general codebook of compositional features to generate an exemplar-oriented compositional codebook by removing those entries whose best matches on a given exemplar are below some predefined threshold.

9. The method of claim 3, wherein step (m) further comprises the step encoding the spatial relationships in a pair-wise spatial relationship representation (PSR), wherein the distance of one objects in the exemplar-based compositional codebook from the PSR of the exemplar used to obtain the codebook is encoded.

10. The method of claim 9, wherein encoding the spatial relationships employs histogram quantization.

11. The method of claim 1, wherein step (e) employs an AdaBoost method.

12. A system for automatically generating a strong classifier for determining whether at least one object is present in at least one image, comprising:
 a camera for receiving at least one image of an object to be detected; and
 a processor communicatively connected to said camera, said processor being configured for:
  (a) receiving a data set of training images having positive images;
  (b) randomly selecting a subset of positive images from the training images to create a set of candidate exemplars, wherein the subset comprises at least one image and the positive images include at least one object of the same type as the object to be detected;
  (c) training one or more weak classifiers based on at least the candidate exemplar from the set of candidate exemplars, the training being based on at least one comparison of a plurality of heterogeneous compositional features located in the at least one image and corresponding heterogeneous compositional features in the at least one candidate exemplar, wherein the training comprises clustering the plurality of heterogeneous compositional features and the corresponding heterogeneous compositional features about set of centers to obtain a set of composite heterogeneous feature clusters and encoding spatial relationships between each of the composite heterogeneous feature clusters in the set of composite heterogeneous feature clusters to produce an exemplar based geometric template; and
  (d) combining the one or more weak classifiers into a strong classifier, wherein the strong classifier is configured to determine the presence or absence in an image of the object to be detected.

13. The system of claim 12, further comprising:
 before step (c), selecting a set of weights based on at least the positive images and before step (d):
 (e) computing error rate of the trained weak classifier;
 (f) repeating steps (c) and (e) for each of the remaining candidate exemplars;
 (g) selecting the trained weak classifier with a lowest error rate; and
 (h) repeating steps (c) and (e) through (g) using another set of weights until all the trained weak classifiers have been selected.

14. The system of claim 12, wherein step (c) further comprises the steps of:
 (i) generating a plurality of single heterogeneous features from the at least one image;
 (j) forming each of the feature clusters into a composition candidate entry in a candidate compositional codebook;
 (k) selecting at least one of the candidate compositions based on a best match to the one of the candidate exemplars to obtain an exemplar-based composition codebook;
 (l) storing the encoded spatial relationships between each of the entries in an exemplar based compositional codebook to produce the exemplar based geometric template;
 (m) comparing the entries in exemplar based composition codebook to the entries in candidate compositional codebook using histogram quantization to obtain a bag of compositional features representation;
 (n) computing differences between distances and orientations of the spatial relationships of the exemplar based geometric template and distances and orientations in the candidate compositions codebook to form a global shape deformation; and
 (o) feeding the bag of compositional features representation and the global shape deformation to a supporter vector machine (SVM), the SVM outputting the weak classifier.

15. The system of claim 12, wherein step (d) employs an AdaBoost method.

16. A non-transitory computer-readable medium carrying one or more sequences for automatically generating a strong classifier for determining whether at least one object is present in at least one image, wherein execution of the one of more sequences of instructions by one or more processors causes the one or more processors to perform the steps of:
 (a) receiving a data set of training images having positive images;
 (b) randomly selecting a subset of positive images from the training images to create a set of candidate exemplars, wherein the subset comprises at least one image and the positive images include at least one object of the same type as the object to be detected;
 (c) training one or more weak classifiers based on at least one candidate exemplar from the set of candidate exemplars, the training being based on at least one comparison of a plurality of heterogeneous compositional features located in the at least one image and corresponding heterogeneous compositional features in the at least one candidate exemplar, wherein the training comprises clustering the plurality of heterogeneous compositional features and the corresponding heterogeneous compositional features about set of centers to obtain a set of composite heterogeneous feature clusters and encoding spatial relationships between each of the composite heterogeneous feature clusters in the set of composite heterogeneous feature clusters to produce an exemplar based geometric template; and
 (d) combining the one or more weak classifiers into a strong classifier, wherein the strong classifier is configured to determine the presence or absence in an image of the object to be detected.

17. The computer readable medium of claim 16, further comprising:
 before step (c), selecting a set of weights based on at least the positive images and before step (d):
 (e) computing error rate of the trained weak classifier;
 (f) repeating steps (c) and (e) for each of the remaining candidate exemplars;
 (g) selecting the trained weak classifier with a lowest error rate; and
 (h) repeating steps (c) and (e) through (g) using another set of weights until all the trained weak classifiers have been selected.

18. The computer readable medium of claim 16, wherein step (c) further comprises the steps of:
 (i) generating a plurality of single heterogeneous features from the at least one image;

(j) forming each of the feature clusters into a composition candidate entry in a candidate compositional codebook;
(k) selecting at least one of the candidate compositions based on a best match to the one of the candidate exemplars to obtain an exemplar-based composition codebook;
(l) storing the encoded spatial relationships between each of the entries in an exemplar based compositional codebook to produce the exemplar based geometric template;
(m) comparing the entries in exemplar based composition codebook to the entries in candidate compositional codebook using histogram quantization to obtain a bag of compositional features representation;
(n) computing differences between distances and orientations of the spatial relationships of the exemplar based geometric template and distances and orientations in the candidate compositions codebook to form a global shape deformation; and
(o) feeding the bag of compositional features representation and the global shape deformation to a supporter vector machine (SVM), the SVM outputting the weak classifier.

19. The computer readable medium of claim 16, wherein step (d) employs an AdaBoost method.

* * * * *